United States Patent
Bertze et al.

(10) Patent No.: US 10,531,342 B2
(45) Date of Patent: Jan. 7, 2020

(54) VOIP SERVICE STATE AWARE HAND OVER EXECUTION

(71) Applicant: TELEFONAKTIEBOLAGET LM ERICSSON (PUBL), Stockholm (SE)

(72) Inventors: Åsa Bertze, Spånga (SE); Steven Corroy, Stockholm (SE); Icaro L. J. Da Silva, Bromma (SE); Jing Fu, Solna (SE); Yu Wang, Solna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 122 days.

(21) Appl. No.: 15/509,663

(22) PCT Filed: Sep. 9, 2014

(86) PCT No.: PCT/SE2014/051035
§ 371 (c)(1),
(2) Date: Mar. 8, 2017

(87) PCT Pub. No.: WO2016/039672
PCT Pub. Date: Mar. 17, 2016

(65) Prior Publication Data
US 2017/0289857 A1 Oct. 5, 2017

(51) Int. Cl.
*H04W 36/00* (2009.01)
*H04W 36/24* (2009.01)
*H04W 36/30* (2009.01)

(52) U.S. Cl.
CPC ..... *H04W 36/0016* (2013.01); *H04W 36/245* (2013.01); *H04W 36/30* (2013.01)

(58) Field of Classification Search
None
See application file for complete search history.

(56) References Cited

U.S. PATENT DOCUMENTS

| 9,668,184 B1 * | 5/2017 | Ramamurthy | H04W 36/16 |
| 2006/0199608 A1 * | 9/2006 | Dunn | H04W 36/14 |
| | | | 455/552.1 |

(Continued)

FOREIGN PATENT DOCUMENTS

KR 10-2014-0101981 A 8/2014

OTHER PUBLICATIONS

International Search Report and Written Opinion dated Mar. 17, 2016 issued in Application No. PCT/SE2014/051035, 10 pages.

(Continued)

*Primary Examiner* — Otis L Thompson, Jr.
(74) *Attorney, Agent, or Firm* — Rothwell, Figg, Ernst & Manbeck, P.C.

(57) ABSTRACT

A Network Node, a Radio Access node and methods therein for handling and supporting Hand Over, HO, in a wireless communication network are disclosed. The method in a Radio Access node comprises receiving, from a Network Node, a VoIP session notification identifying a traffic flow associated with VoIP related to a UE. The method further comprises receiving, from the Network Node, a VoIP state report for the identified traffic flow, said VoIP state report comprising a determined VoIP state, and a prediction related to a time to a VoIP state change. Further, the method comprises, when the UE is a candidate for HO: deciding whether to delay or to trigger the HO based on the VoIP state and the prediction.

35 Claims, 9 Drawing Sheets

(56) References Cited

U.S. PATENT DOCUMENTS

| | | | | |
|---|---|---|---|---|
| 2010/0304738 A1* | 12/2010 | Lim | ................ | H04W 36/30 |
| | | | | 455/426.1 |
| 2011/0051684 A1* | 3/2011 | Li | ................ | H04W 36/20 |
| | | | | 370/331 |
| 2014/0355566 A1* | 12/2014 | Walley | ................ | H04W 36/245 |
| | | | | 370/331 |
| 2015/0146689 A1* | 5/2015 | Fu | ................ | H04J 3/0632 |
| | | | | 370/331 |
| 2015/0237552 A1* | 8/2015 | White | ................ | H04W 36/14 |
| | | | | 370/331 |
| 2015/0304929 A1* | 10/2015 | Hua | ................ | H04W 36/32 |
| | | | | 455/436 |
| 2016/0242032 A1* | 8/2016 | De Kievit | ................ | H04L 9/088 |
| 2016/0345220 A1* | 11/2016 | Brisebois | ................ | H04W 36/023 |
| 2018/0098258 A1* | 4/2018 | Annam | ................ | H04B 17/24 |

OTHER PUBLICATIONS

Choi, H. et al.: "Voice-activity-based vertical handover in 3G-WLAN interworking networks", Electronic Letters, The Institution of Engineering and Technology, vol. 45, No. 21, Oct. 8, 2009, pp. 1099-1101, XP006034000.

* cited by examiner

■ VoIP packet with voice    ☰ VoIP packet without voice    ■ SID frame

VOIP SERVICE STATE AWARE HAND OVER EXECUTION

CROSS REFERENCE TO RELATED APPLICATION

This application is a 35 U.S.C. § 371 National Stage of International Application No. PCT/SE2014/051035, filed Sep. 9, 2014, designating the United States, the disclosure of which is incorporated by reference.

TECHNICAL FIELD

The solution described herein relates generally to handling of Hand Over, HO, and in particular to handling of HO of User Equipment, UEs involved in voice services, such as Voice over IP, VoIP.

BACKGROUND

The concept of a mobile communication system is that a large number of base stations, i.e. radio access nodes, cover a geographical area and provides mobility to a number of users equipped with wireless devices, which may be denoted e.g. User Equipment, UEs or mobile handsets. Herein, mainly the term UE will be used. A very basic requirement of such a system is that, as the wireless devices move from one cell to another, it must be possible to hand over an ongoing call or data session from one base station to another in a manner which does not cause annoying disruptions in the calls or data sessions.

Mobility in 3GPP Networks

The purpose of the handover, or Hand Over, HO, is to manage the mobility of UEs from the coverage of one radio access node to another. This ensures that the UE is being served by the "best", or most suitable, cell at all times, and thus avoids connection releases as the UE moves out of a coverage zone of one cell into the coverage zone of another. A HO can also be performed for capacity reasons, e.g. in case of load balancing when neighboring cells have very different loads. In that case, what motivates a HO is the optimization of the overall system capacity and/or end user quality of experience, QoE.

In 3GPP systems, HO is network controlled based upon UE measurement reports of the radio quality level of the serving cell and neighboring cells, which may be potential "next serving cells". These reports are configured via measurement configuration procedures.

The mobility framework in 3GPP networks for UEs in connected mode is based on the concept of so-called mobility events. The UE is configured to perform periodic measurements of Reference Signal Received Power, RSRP, and Reference Signal Received Quality, RSRQ, based on radio signals received from the serving cell and from adjacent cells. Mobility events are configured in such a way that, when a predefined condition related to these measurements is fulfilled, the UE sends a measurement report indicating the occurred event.

Intra-LTE HO

The Intra-LTE HO feature configures a mobility event called EventA3 as defined in 3GPP TS 36.331. The EventA3 implies that one or several neighbor cells become better, by an offset, than the serving cell. An intra-LTE HO preparation phase is illustrated in FIG. 1.

The process employed by the UE for the evaluation of surrounding cells uses parameters sent by the serving eNB to the UE. These parameters include hysteresis and offset values, time to trigger, and optionally cell individual offset margins.

The Intra-LTE HO feature is based on the evaluations reported to the eNB by the UE. The serving eNB uses the reports to select and prepare the target eNB, then ultimately execute the HO.

Measurement Configuration

Once the UE is configured, during connection establishment, measurements commences on the serving and neighboring cells when the RSRP of the serving cell falls below the value defined in the sMeasure parameter. The UE detects neighboring cells through intra-frequency searches. The UE uses either RSRP or RSRQ measurements to determine whether the EventA3 condition is fulfilled. Measurements of RSRP or RSRQ are performed on the serving and detected neighboring cells.

The UE then uses an offset value, a3offset, a hysteresis value, hysteresisA3, and a time to trigger, timeToTriggerA3, to determine whether to trigger the EventA3. The parameter cellIndividualOffsetEUtran can be set per cell relationship and the value is added by the UE to the measured value of the neighbor before EventA3 evaluation is done by the UE. The UE uses the following formula for evaluating entry to EventA3:

$$Mn+\text{cellIndividualOffset}EUtran-\text{hyteresys}A3>$$
$$Ms+a3\text{offset}$$

where Mn=Measured value of the neighboring cell (RSRP or RSRQ) and Ms=Measured value of the serving cell (RSRP or RSRQ).

Once entering EventA3, the UE continues to evaluate EventA3 a predetermined time (timeToTriggerA3) before the event is fulfilled and a measurement report is sent to the serving eNB. These measurement reports contain measurements for the serving cell and a configurable amount of detected intra-frequency neighbor cells. Measurement reports are sent periodically while the EventA3 condition is fulfilled.

The measurement reports are event-triggered and resent periodically as long as the event is fulfilled. The hysteresis value is used to avoid immediate retriggering of the event.

HO Evaluation and Execution

The eNB starts the so-called "best cell evaluation process" when a measurement report is received from a UE. The process performs selection of a target cell for the UE and HO preparation.

When an EventA3 measurement report is received for a UE, the serving eNB sends a request to the target eNB about resources to facilitate the HO. Upon receiving a positive acknowledgement to the HO request, the serving eNB sends HO directions to the UE and suspends scheduling new data transmissions to the UE.

The UE starts the move when the source eNB sends an RRCConnectionReconfiguration message to the UE telling it to perform a HO. After successfully accessing the target cell the UE sends an RRCConnectionReconfigurationComplete message. The time between these messages is the handover interruption time, which according to earlier measurements in an LTE network is on average 90 ms. However, some of the HOs have a significantly larger outage time, which may be above 200 ms.

Conversational Speech and VoIP

Voice calls are a part of the traffic in mobile communication systems. Below, the characteristics of conversational speech, i.e. inter-human verbal communication, will be described. The reason for this will be apparent further below.

Conversational Speech Characteristics

There exist several models for conversational speech. The models aim to correctly generate the on-off patterns in conversational speech, including short silence gaps and the effects of interaction between parties. One such model, called the Brady model, is illustrated in FIG. 2.

Speech can be modeled as short talk spurts, separated by silence gaps. These silence gaps can be classified into three types. The first type of silence is when one person is listening to the other person in a conversation. The second type of silence is between sentences where the speaker takes a longer break. The third type of silence is between words in a sentence.

For silence periods between sentences, the duration is between 200 ms and 2 seconds, with median duration 500 ms. For silence periods between words, the duration is between 0 and 200 ms, with median duration 30 ms. The length of a talk spurt is between 5 ms and 5 s.

According to a two-way conversational model presented by the creator of the Brady model, the average percentage of the mutual silence state in a conversation is about 19% and the average duration of a mutual silence is about 300 ms.

VoIP Traffic Characteristics

Voice over IP, VoIP, represents the transmission of the conversational speech service over Internet Protocol, IP-based networks. It has been widely applied in both wired and wireless communications.

A large variety of technologies that support VoIP services have been developed. From a protocol stack perspective, the VoIP protocols are built on top of either the Transmission Control Protocol, TCP, or the User Datagram Protocol, UDP, as shown in FIG. 3.

The traffic characteristics of the VoIP packets delivered to the underlying network protocols are to a large extent determined by the compression/decompression applied to convert audio signals into a digital bit stream and vice versa. The traffic characteristics include silence duration due to the on-off conversational characteristics described above, voice payload size, packets inter-arrival time, etc.

The traffic characteristics of lower protocol layer packets depend on the overheads, structure and implementation of the underlining protocols. Nevertheless, they should be similar to the VoIP packet characteristics.

Traffic Characteristics During Silent Periods

As stated in above, conversational speech traffic has silent states due to the nature of human conversation. VoIP technologies utilize this property in order to reduce bandwidth usage. Two categories of solutions have been developed to address the transmission adaptation to the silent periods.

A. Silence Suppression

When silence suppression is applied in a coder/decoder the packet sending rate is reduced during a silent period or state, i.e. when the user is not talking. The silent state is detected by voice activity detection, VAD, which is implemented in the transmitter. In general, a VAD algorithm requires about 200 ms to detect the silence period. Among the three types of silence gaps described above, the first two types, i.e. silence while listening and the inter-sentence silence, can be detected by the VAD.

Once a silence period is detected, a Silence Insertion Descriptor, SID frame may be sent to the receiver. The SID indicates the beginning of a silence period and provides a noise level for the receiver to configure parameters for generation of so-called Comfort Noise. The transmission of SID frames during the silence period may be either triggered by a significant change in background noise, or sent repeatedly with a periodicity of e.g. up to 480 ms.

For the detection of a silence period when applying SID frames, a period may be deemed to be a silence period e.g. if there are no packets received during a time period longer than a threshold of 100 ms; otherwise, it may be considered a speech period.

B. No Silence Suppression

Some VoIP applications, such as Skype, do not employ silence suppression. That is, silence is not handled differently than active speech, but is encoded and transmitted to a peer. This increases the bandwidth usage as compared to the case when silence suppression is used. However, transmitting these silence packets has some advantages, as for example, it maintains the UDP bindings at Network Address Translation, NAT. In the case where media traffic flows over TCP, use of silence packets avoid the drop in TCP congestion window size, which otherwise would take some Round-Trip delay Time, RTT, to reach the maximum level again. However, the packet size during a silence period may still decrease.

In order to eliminate packet losses during LTE HOs, packet forwarding has been implemented. That is, packets arriving to the former serving cell are forwarded to the new serving cell. However, packet forwarding cannot solve the problem that the packets are delayed at least a time equal to the handover outage time, i.e. the time when the UE is disconnected from the former serving cell and not yet connected to the new serving cell. For a VoIP application, packets that arrive too late to be useful are just as bad as real packet losses.

Further, it is known that the delay over the so-called X2 interface between eNBs may be significant. Depending on deployment, forwarding over the X2 interface can add an additional ~50 ms delay to the forwarded packets, which degrades the VoIP quality.

The solution described herein aims to reduce the VoIP QoE degradation associated with HO, an objective typically neglected by other mobility algorithms.

In the prior art, one example has been found of that the properties of conversational speech have been exploited in association with HO, namely [1]. In [1], the state of a voice call is determined. If the state is silent, or idle, the HO is executed, and if the state is active, the HO is delayed in wait of that an idle state may be entered. If no such state is entered within a certain time, the HO is executed in spite of that the voice call is in an active state. The analysis of the voice call in [1] is performed in a handset.

However, the inventors have realized that even what is described in [1] is associated with problems, and that there is a need for an improved HO mechanism taking QoE into account.

SUMMARY

Herein, a solution is provided to improve the VoIP quality during network-controlled Hand Overs, HOs, in a mobile network. This is achieved by analyzing and predicting the traffic in a VoIP flow and controlling the HO execution at a radio access node to be performed at a suitable time from a VoIP traffic point of view; preferably at a time when no speech is being transmitted, at least in the downlink. This is done to minimize the negative effect of long speech packet delays due to a HO interruption time.

According to a first aspect, a method for handling HO is provided, which is to be performed by a Radio Access, RA, node operable in a wireless communication network. The method comprises receiving, from a Network Node, a VoIP session notification identifying a traffic flow associated with VoIP related to a UE; and further receiving, from the Network Node, a VoIP state report for the identified traffic flow. The VoIP state report comprises a determined VoIP state and a prediction related to a time to a VoIP state change. Further, the method comprises, when said UE is a candidate for HO: deciding whether to delay or to trigger the HO based on the VoIP state and the prediction.

According to a second aspect, a method for supporting HO is provided, which is to be performed by a Network Node which is operable in a wireless communication network. The method comprises detecting a traffic flow associated with VoIP related to a Radio Access node and a UE. The method further comprises sending a VoIP session notification to the RA node, identifying the traffic flow associated with VoIP. The method further comprises determining a VoIP state of the traffic flow, and deriving a prediction related to a time to a VoIP state change for the traffic flow. Further, the method comprises sending a VoIP state report for the traffic flow to the RA node, said VoIP state report comprising the determined VoIP state and the prediction, which VoIP state report enables the RA node to decide whether to delay or trigger a HO of the UE based on said information.

According to a third aspect, a Radio Access, RA, node is provided for handling of HO. The RA node is operable in a wireless communication network, and is configured to receive, from a Network Node, a VoIP session notification identifying a traffic flow associated with VoIP related to a UE. The RA node is further configured to receive, from the Network Node, a VoIP state report for the identified traffic flow, where the VoIP state report comprises a determined VoIP state and a prediction related to a time to a VoIP state change. The RA node is further configured to, when the UE is a candidate for HO, decide whether to delay or to trigger the HO based on the VoIP state and the prediction.

According to a fourth aspect, a Network Node for supporting HO is provided. The Network node is operable in a wireless communication network, and is configured to detect a traffic flow associated with VoIP related to an RA node and a UE. The Network node is further configured to send a VoIP session notification to the RA node, in which the traffic flow associated with VoIP is identified. The Network node is further configured to determine a VoIP state of the traffic flow, and to derive a prediction related to a time to a VoIP state change for the traffic flow The Network node is further configured to send a VoIP state report for the traffic flow to the RA node, where the VoIP state report comprises the determined VoIP state and the prediction. The VoIP state report enables the RA node to decide whether to delay or trigger a HO of the UE based on said information.

With the proposed invention, the degradation in the VoIP QoE can be reduced by triggering the HO execution during VoIP silence periods. During silence periods long packet delays or packet losses are not as noticeable to the end user as if the same happened during an ongoing talk spurt, which means the QoE degradation is reduced if the HO can be executed, as often as possible, during silence periods.

For the case when packet forwarding is implemented over interfaces such as X2/S1, this invention reduces the traffic over these interfaces during HO (since the amount of data to forward during silence periods is much less than during talk spurts). This is a benefit both from resource utilization of the X2/S1 links, and also since less data is competing for this links it will lead to reduced delays of the data that should be forwarded.

Another advantage of the invention is the possibility to reuse standardized mobility mechanisms. Additional intelligence in the HO execution algorithm enables VoIP aware HO execution, but without much modification of the standardized mobility mechanisms.

It should also be noted that VoIP is not an application that requires a high throughput. Delaying or speeding up the HO execution might have a bad impact on a high-throughput services, such as for example FTP download, since the UE is then not always connected to the cell with the best radio environment. But for VoIP service this is not an issue, since only a relatively low throughput needs to be supported for the service.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1:
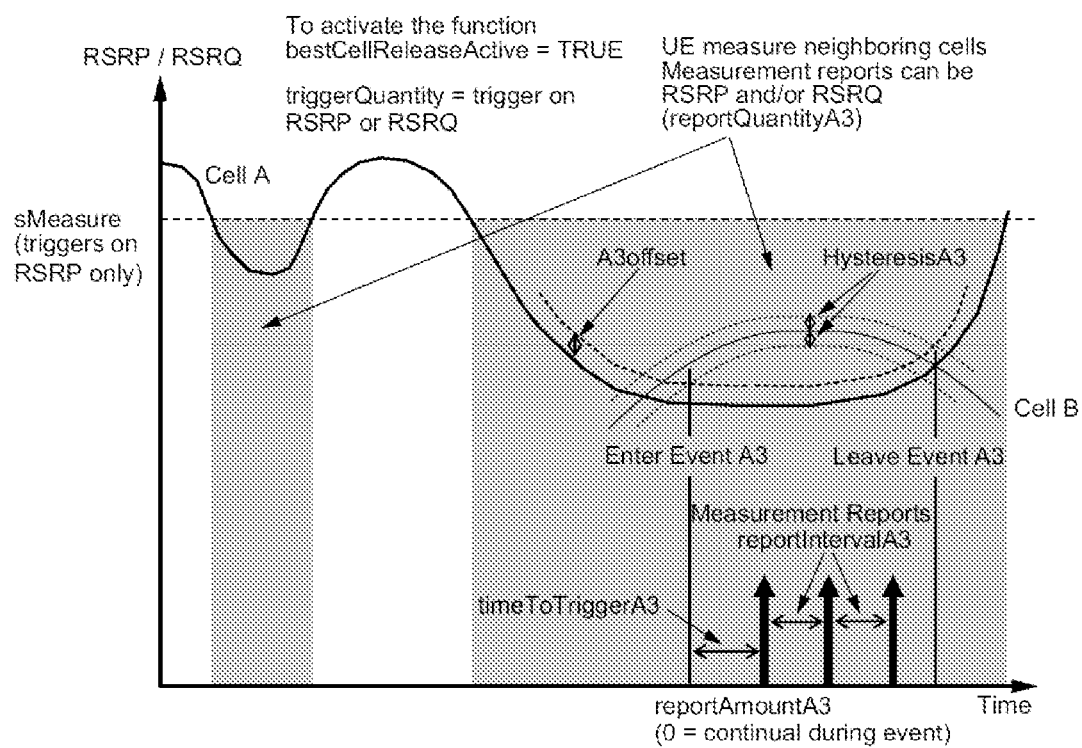
FIG. 1 illustrates an Intra-LTE Hand Over Preparation phase, according to the prior art.

Herein, a method for handling Hand Over will be described. The inventors have realized that the properties of conversational speech described above could be utilized for mitigating disruptions associated with HO of voice calls. Based on this insight the inventors have created a solution, which may be referred to as an enhanced VoIP aware mobility mechanism. This mechanism will be described below with reference to the drawings.

As previously mentioned, there is one example of that the properties of conversational speech have been exploited in association with HO in the prior art [1]. There are, however, important differences between [1] and the herein suggested solution, which will be explained in detail below. One such difference is that a prediction of a future VoIP state is performed and applied in the herein suggested solution. No such prediction is used or even suggested in [1]. The prediction enables a RA node to decide whether to delay or whether to execute a HO in a more refined way than in [1].

Further, the herein described solution is located in the network, and not in a handset, as in [1]. Locating the VoIP aware mobility mechanism in the network implies several advantages, e.g. related to modelling of the VoIP traffic. In the network the mechanism has access to information about all VoIP flows passing through the system, and can use this information to train accurate VoIP state prediction models, something that is not possible with a mechanism located in the UE. Even though the Brady model is discusses in [1], this is only in order to illustrate that there is silence in a human conversation, and is not in any way for VoIP state prediction as in the herein suggested solution.

In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

The term "VoIP" used herein, in expressions, such as "VoIP traffic" and "VoIP" state, is considered to encompass several variants of VoIP, such as Voice over LTE, VoLTE, and proprietary VoIP solutions such as Skype.

Embodiments of Methods

Embodiments of a method will first be described as seen from a perspective of an RA node, e.g. an eNB or BS, and then embodiments of the method will be described as seen from a perspective of a Network Node; which may be the RA node or some other node.

Method in a Radio Access, RA, Node.

Example of embodiments of a method performed by an RA node, for handling HO, will now be described with reference to a flowchart depicted in FIG. 4. The method comprises the following actions, which actions may be taken in any suitable order.

Action 401

The RA node receives, from a Network Node, a VoIP session notification identifying a traffic flow associated with VoIP related to a UE served by the RA node.

The traffic flow is a flow of VoIP traffic or VoIP related traffic between two end points. It could be compared to a channel for VoIP traffic between the two end points. The two end points would in this case be the UE served by the RA node and some remote unit, e.g. a UE, which will not be further specified here.

Action 402

In this optional action, the RA node requests a VoIP state report for the identified traffic flow from the Network Node. This may be performed in response to the received VoIP session notification, or, it may be triggered by an event, such as an indication related to a possible HO of the UE to another RA node.

Action 403

The RA node receives, from the Network Node, a VoIP state report for the identified traffic flow, said VoIP state report comprising a determined VoIP state, and a prediction related to a time to a VoIP state change.

The VoIP state report could be received in response to a VoIP state report sent by the RA node. Alternatively, the VoIP state report could be received without any foregoing request, e.g. periodically and/or triggered by a condition in the traffic flow. The determined VoIP state could alternatively be denoted "current VoIP state". The determined VoIP state may be one of a number of different VoIP states, which will be further described below. The prediction related to a time to a VoIP state change may also be configured in different ways, which will be described further below. However, the determined VoIP state relates to a characteristic or condition of the traffic flow, which makes a current state more or less sensitive for HO, e.g. in regard of packet loss and user experience.

Action 404

When the UE associated with the VoIP flow is a candidate for HO, the RA node decides whether to delay or to trigger the HO based on the VoIP state and the prediction.

By being "candidate for HO" is here meant e.g. that the RA node has detected or received some indication of that the UE is in question for a HO. The RA node may have received signaling indicating a mobility event such as the previously described so-called EventA3. It is not the information related to VoIP that makes a HO necessary or initiates the HO in the first place. However, when the UE is in question for HO, the RA node decides whether to immediately trigger the HO or whether to delay the HO based on the VoIP state and the prediction.

The actions described above are performed by the RA node in order to avoid executing a HO in a VoIP situation where it may cause quality problems, when it would be advantageous to wait for a more beneficial VoIP situation. When the VoIP situation, which is indicated by the determined or current VoIP state, is unsuitable for HO, and a new VoIP state will be entered within a certain time, which is indicated by the prediction, then the RA node should decide to delay the HO. Otherwise the HO should be triggered. This will be further described below.

For example, a HO may be decided to be delayed when the determined VoIP state belongs to a first group of VoIP states and the prediction indicates that a time to a VoIP state change is within an estimated deadline for HO due to radio conditions.

Figure 2:
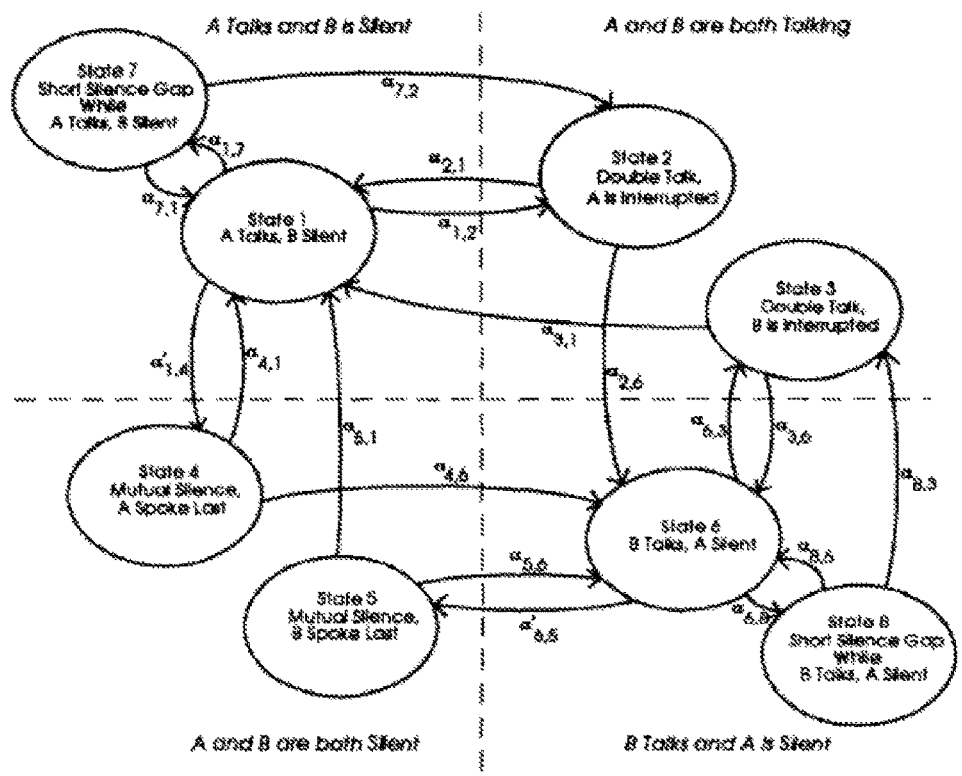
FIG. 2 shows a modified eight-state Brady model for the on-off characteristics of conversational speech, including short silence gaps.
Figure 3:
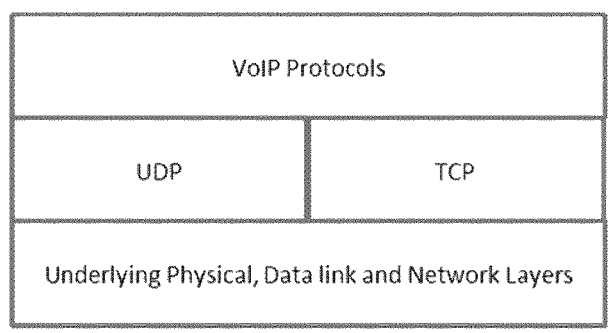
FIG. 3 illustrates VoIP protocols in relation to other network protocols.

The first group of VoIP states, which may comprise one or more states, could be assumed to comprise VoIP states which are defined as unsuitable for HO, i.e. that HO should be avoided during these states, when possible. A VoIP state is related to the amount of traffic or packets in the traffic flow. As previously described, a human conversation can be modeled as different states, which is also illustrated in FIG. 2. When related to VoIP traffic, the different conversational states represent different amounts of traffic, and also in different directions in terms of uplink or downlink, as seen from an RA node. The amount of states used for modeling a conversational call may differ, but the conversational feature which implies the most amount of traffic is double-talk, i.e. when both parties involved in the conversation talk at the same time. This may be defined as a VoIP state, which is unsuitable for HO.

The prediction, which may indicate that a time to a VoIP state change is within an estimated deadline for HO due to radio conditions, could indicate this explicitly or implicitly. For example, the prediction could comprise an explicit time period, which states how long it will take until the determined or current VoIP state is left for another VoIP state. Alternatively, a flag, or similar, could be used to indicate that the determined VoIP state will be left within an estimated deadline for HO due to radio conditions, or not. The estimated deadline for HO due to radio conditions is not in itself assumed to be comprised in the VoIP state report. This estimated deadline may be a value based on statistics of historical HOs in the network, and/or be dynamically determined by the RA node based e.g. on a change in received signals strength in the RA node or UE. The estimated deadline may further be based on the movement of the UE in terms of e.g. direction and velocity.

The HO may be decided to be triggered, i.e. executed, when the determined VoIP state belongs to a first group of VoIP states and the prediction indicates that a time to a VoIP state change exceeds an estimated deadline for HO due to radio conditions. That is, no new VoIP state, or at least no new VoIP state which is better than the current, will be entered before it is too late. By too late, or before an estimated deadline is meant before the HO must be executed anyway due to regular HO criteria, such as received signal strength at the UE.

In addition to being related to a time to a VoIP state change, the prediction may indicate a predicted next VoIP state. Further, the deciding of whether to delay or to trigger the HO may be based also on the next VoIP state.

When a VoIP state change is defined e.g. as a change between any VoIP states, it may occur that a predicted next VoIP state is no better for HO than a current determined VoIP state. Therefore, it may be beneficial to include the next VoIP state in the VoIP state report and base the decision of whether to trigger or delay the HO also on this information.

For example, the HO may be decided to be delayed when the determined VoIP state belongs to a first group of VoIP states and the prediction indicates that a time to a VoIP state change is within an estimated deadline for HO due to radio conditions, and that the next VoIP state belongs to a second group of VoIP states. The second group of VoIP states, which could comprise one or more VoIP states, could be assumed to comprise VoIP states which are defined as suitable for HO, i.e. that HO, when in question, should preferably be performed during these states in order to avoid e.g. quality issues due to packet loss.

And, consequently, when the determined VoIP state belongs to a first group of VoIP states and the prediction indicates that the next VoIP state also belongs to the first group of VoIP states, the HO should be triggered without delay.

Alternatively, a VoIP state change could be defined as a change to a VoIP state belonging to another group of VoIP states than the determined VoIP state. That is, an indicated time to a VoIP state change would be a time to a change to a VoIP state of another group. When the determined or current VoIP state is a state defined as unsuitable for HO, it would be a time to a change to a VoIP state which is defined as suitable for HO.

A first group of VoIP states could comprise at least the VoIP states: active bidirectional VoIP traffic; and active unidirectional VoIP traffic in the downlink direction to the UE served by the RA node.

A second group of VoIP states could comprise at least the VoIP state mutual silence, with no VoIP traffic in either direction. The traffic flow in the VoIP state mutual silence could, however, comprise e.g. SID frames, or other indications of absence of speech. The second group could further comprise a VoIP state of active unidirectional VoIP traffic in the uplink direction from the UE served by the RA node. For example, There could be a service quality benefit of executing a HO when the user of the UE associated with the RA node is talking, since this may avoid X2 forwarding of VoIP packets, which causes further delays than just the handover outage time. Further, an operator may prefer to perform the HO when its own customer, served by the base station, is talking, since this will mean less effect on the service quality for the own customer who will not notice the outage in this case.

When the RA node has decided whether to trigger or delay the HO of the UE, the RA node may take action in line with the decision, i.e. delay or trigger the HO of the UE according to the decision.

Method in a Network Node.

Below, examples of embodiments of a method performed by a Network Node, for handling HO, will be described with reference to a flowchart depicted in FIG. 5. The method may be denoted as a "VoIP Service state detection and prediction function", which monitors VoIP packets to and from mobile terminals. A VoIP service state detection and prediction module may analyze a flow of VoIP packets in order to determine the current state of ongoing VoIP services, and also to predict a future state of the flow, in terms of VoIP traffic. The method comprises the following actions, which actions may be taken in any suitable order.

Action 501

The Network Node detects a traffic flow associated with VoIP related to an RA node and a UE served by the RA node.

In order to do this, the Network Node monitors traffic to and from UEs served by the RA node. Thus, when VoIP related packets are detected, a flow associated with VoIP is detected. The Network node can then determine an identity of the flow. The identity of the flow could be one or more of e.g. source IP address, destination address, source port, destination port, protocol. These identities can further be connected to other identities used by the RA, such as eNB UE S1AP ID and E-RAB id.

Action 502

The Network Node sends a VoIP session notification to the RA node, identifying the traffic flow associated with VoIP.

By sending the VoIP session notification, the Network Node informs the RA node of that the flow is a VoIP flow. The RA node can then identify the traffic flow as a VoIP related flow.

Action 503

In this optional action, the Network Node determines whether a request for a VoIP state report has been received from the RA node. In case the Network Node is the same node as the RA node, this report would be received from within the RA node, i.e. via internal signaling. When the Network Node and RA node are separate nodes, this would be received over a backhaul link from the RA node. As previously stated, the request is not mandatory, but could be configured in certain implementations.

Action 504

In this action, the Network Node determines a VoIP state of the traffic flow.

This action could be performed e.g. by observing VoIP packets and other VoIP related packets of the traffic flow, including absence of VoIP packets. VoIP related packets could be e.g. SID frames, if these were not to be considered as true VoIP packets. By comparing the character of the current traffic to a set of defined VoIP states, a current VoIP state could be determined. This will be described in more detail further below.

Action 505

In this action, the Network Node derives a prediction related to a time to a VoIP state change. This could be done in different ways, which will be further described below.

Action 506

In this action, the Network node sends a VoIP state report for the traffic flow to the RA node. The VoIP state report comprises the determined VoIP state and the prediction. By providing the VoIP state report to the RA node, the Network Node enables the RA node to decide whether to delay or trigger a HO of the UE based on the information in the report.

The information in the VoIP state report could be expressed in an explicit or implicit manner, as previously described.

For implementations applying a VoIP state report request procedure, the VoIP state report could be sent in response to such a request.

The prediction may, in addition to being related to a time to a VoIP state change, further indicate a next VoIP state. That is, when deriving a prediction, a next VoIP state may be derived, i.e. predicted, and signaled to the RA node.

The prediction may be derived, e.g. performed or calculated, based on a statistical model underlying the behavior of a conversation, or, it may be derived based on machine learning. These different alternatives will be described in more detail further below.

Further, the prediction may be derived based on model information and/or on statistics gathered from a plurality of historic VoIP flows served by the wireless communication network. For example, information may be gathered from individual end point pairs of a number of traffic flows associated with VoIP.

System Architecture

Figure 6:
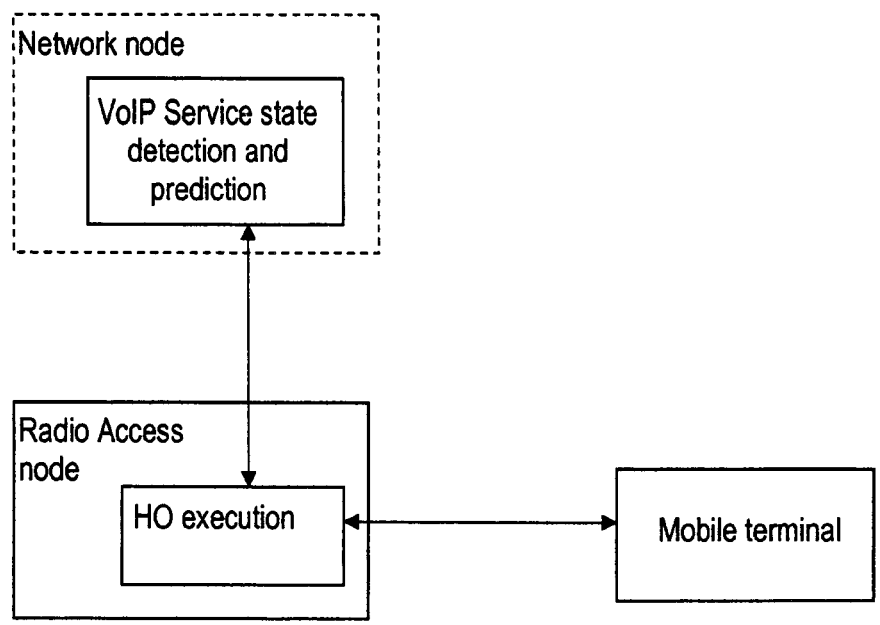
FIG. 6 illustrates a system architecture comprising three nodes, and communication between the nodes or functions, according to an exemplifying embodiment.

An exemplifying architecture of the herein suggested enhanced VoIP aware mobility mechanism is shown in FIG. 6. In FIG. 6, the VoIP service detection and prediction function illustrated as being located in another network node than the RA node. It could alternatively be located within the RA node, as previously described. Therefore, the network node is illustrated with a dashed outline. FIG. 6 also illustrates communication between the RA node and the Network Node comprising the VoIP service detection and prediction function; and communication between the RA node and a mobile terminal, i.e. a WD.

VoIP Service State Detection

The determining of a current VoIP state of a traffic flow associated with VoIP may comprise detecting of silence period in a VoIP flow using information from passive probe. A passive probe listens to the network traffic without disturbing the actual traffic. This could for example be achieved by an optical splitter or by port mirroring on a switch or router. One way to detect a silence period is by analyzing so-called Silence Insertion Descriptor, SID, frames. The SID frames may be differently configured in different standards. Therefore, it is preferable that the detection function has knowledge of different VoIP standards, such that e.g. an identification module may be adjusted e.g. when there are changes in a standard or when new standards arrive. In general, the first SID frame is sent out when the end host detects a silence period with Voice Activity Detection, VAD. Although VAD algorithms may vary from implementation to implementation, the detection delay is typically around 200 ms.

A second way used to identify speech inactivity is by monitoring the periodicity and sizes of VoIP packets. When there are speech data, the periodicity of voice packets are in general 20 ms. When there are silences in the speech, the periodicity of voice packets is changed, and may be as long as 480 ms. In addition, the packets sizes during silence period with SID frames are in general much smaller compared to normal voice packets. Therefore, by monitoring the periodicity and packet size changes of VoIP packets, the function may detect the silence periods. This solution can also work for encrypted VoIP traffic since it only analyzes packet periodicity and packet sizes.

VoIP Service State Prediction

Embodiments of the herein disclosed solution not only detect, but also predict the state of a VoIP flow for the near future. Such a prediction is a valuable input to the HO execution algorithm for determining if the HO should be executed immediately or if it is beneficial to wait for an upcoming silence period or other beneficial VoIP state. In some situations, the use of a prediction leads to another decision than when only utilizing information on a current state for making a decision of whether to delay or immediately trigger/execute a HO.

In general the information that is easiest to access and/or detect in a VoIP traffic flow is a sequence of VoIP packets followed by a SID frame. The packets may be observed e.g. by a passive probe. By only counting the number of VoIP packets between two SID frames, a probe does not need to process the data in the VoIP packets. On the other side, using the content of VoIP packets can significantly improve the prediction accuracy. It may, however, be a problem to access the content of the packets, e.g. when the VoIP flow is encrypted. In should be noted that when the monitoring is performed within an RA node, e.g. eNB, no probe is needed, since the eNB itself handles the user-plane packets, and can inspect them as part of that handling.

Figure 7:
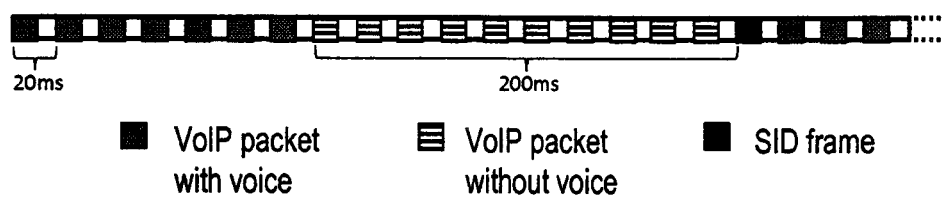
FIG. 7 illustrates an exemplifying VoIP flow.

An example of a traffic flow associated with VoIP is shown in FIG. 7. In FIG. 7, VoIP packets comprising speech are grey, VoIP packets without voice have horizontal lines, and SID frames are black. One method is to count the number of VoIP packets comprising speech (grey) and to derive a probability or rule to indicate an upcoming silence period. The 200 ms of VoIP packets without speech in FIG. 7 represent the time it takes for a VAD to detect a silence. A more involved method is to combine this counting with the processing of the VoIP packets.

Two main approaches for performing the prediction are proposed by the inventors, the first is based on a statistical model underlying the behavior of a conversation, and the second is based on machine learning.

Stochastic Prediction

As can be seen e.g. in the so-called Brady model illustrated in FIG. 2, a conversation can be modeled using a Markov chain parameterized with transition probabilities. The states do not necessarily need to match the states of FIG. 2.

According to an exemplifying embodiment of the herein presented solution a Markov chain model is used in the following way. A probe is used for detecting packets, and may also be used for performing calculations. When the probe detects that the system is in a specific state, a probability for changing state may be calculated. More specifically, when a user is talking, the probability may be calculated for that the user will make a small pause between two sentences or stop to talk and listen to the other user.

By use of the IP addresses of the transmitter and receiver, i.e. the end points of the traffic flow; the frequency of VoIP packets and the last received SID frame, the probe may derive which user that is talking:

When a user A is talking, there are two important probabilities that can be calculated using the Markov chain.

1. $P_{short}$: the probability to make a short break between two sentences
2. $P_{long}$: the probability to make a long break, i.e., the other user will start to talk These two probabilities can be calculated using the probability transitions from the Markov chain. Furthermore, the number of sent VoIP packets can be used to change the probability calculation. For example, the more VoIP packets received by the probe, the smaller the probability will become for a transition from the state "user A talking" to the same state "user A talking". This way, the probability to stop talking will increase with the length of the present monologue.

By defining e.g. two thresholds $T_{short}$ and $T_{long}$ it can be predicted:
1. A short silence if $P_{short} > T_{short}$
2. A long silence if $P_{long} > T_{long}$ Machine Learning Prediction Another alternative is to perform the prediction by means of machine learning. This method consists of a machine learning algorithm mapping a sequence of inputs to a prediction of an upcoming state, e.g. a silent period. A prediction is made after each received VoIP packet.

In an exemplifying embodiment, the input features used are:
  Number of received VoIP packets since the last SID frame: the more received VoIP packets, the higher the probability to have a silent period.
  Frequency of VoIP packets since the last SID frame: in this case we would like to have two bins, one for the high frequency packets (<=20 ms period) and one for the low frequency packets (>20 ms period), each bin contains the number of packets from a certain type. If there are more packets in the low frequency bin then it means that the user didn't speak for a long time and if the high frequency bin has the more packets, it means that a user is talking for a long time.
  Size of VoIP packets since the last SID frame: similarly as the previous feature, we create two bins, one for long packets and one for short packets. Long packets indicate voice, short packets silence.
  Content of the VoIP frame: there are many options to use machine learning based on the voice signal to predict the upcoming silent periods. We can use as parameters a certain number of consecutive samples $n_s$ in the last received packet. The amplitude or power of the signal is correlated to the presence of voice.
  Spectrum of the VoIP signal: silence will have a flat spectrum and voice a sparser spectrum.

The learning algorithms that can be used are e.g.:
Logistic regression
Neural networks
SVM The output can be e.g.:
Binary: upcoming silent period or not
Multi-valued: upcoming long silent period, short silent period, no silent period
Real valued: next silent period of length L upcoming in time T Communication Between the RA Node and the Network Node Performing the VoIP State Detection and Prediction.

One aspect of the solution disclosed herein is the communication between the Network Node performing the VoIP flow and silence detection and state prediction, and the RA node, where the HO execution functionality is placed. In one embodiment, the RA node is an eNodeB in an LTE network. The description below is written as if the Network node and the RA node are separate nodes, but the Network node may alternatively be the same node as the RA node. The communication would in that case be of a node internal character.

In an exemplifying embodiment, the VoIP Service state detection and prediction function sends a VOIP_SESSION_NOTIFICATION_MESSAGE to the RA node, which message contains one or more flow identifiers, e.g. IP addresses of the end points of the flow. The one or more flow identifiers should enable a HO execution function to associate the received information to a specific flow at the Radio Access Node, i.e. to identify a VoIP flow based on the information in the VOIP_SESSION_NOTIFICATION_MESSAGE. The HO Execution Function at the After receiving the VOIP_SESSION_NOTIFICATION_MESSAGE, the RA node may send a VOIP_STATE_REPORT_REQUEST to the Network node. Such a request may comprise e.g. a configuration concerning how the VoIP reports are to be sent from the VoIP Service State Detection and prediction Function or module. The request message may specify a "reporting mode" which can be set e.g. to "periodic". The message could also contain a period P for configuring how often a report should be sent. Upon the reception of such a request, the VoIP Service State Detection and prediction Function or module may start to send a VOIP_STATE_REPORT at each period P. The VoIP State Report comprises VoIP state information and a prediction. In the simplest case the VoIP state may be e.g. "active" or "silent", and the prediction may comprise an explicit predicted time to a VoIP state change. This information may be kept in a memory for the HO Execution Function e.g. until a new VoIP state report is received by the RA node. The predictions may comprise information about how much time it is left until a silence period, if the VoIP state="active"; or e.g., how much time it is left until an active period, if the state="silent".

A VOIP_STATE_REPORT_REQUEST may specify a "reporting mode" which can be set e.g. to "aperiodic" or "periodic". The message may further contain a "reporting type" which can be e.g. "Binary", "Multi-valued" or "real-valued". Upon the reception of a request configuring "aperiodic" reports, the VoIP Service State Detection and prediction Function or module may send a VOIP_STATE_REPORT e.g. every time the state has changed from idle to active or from active to idle. This information may be kept in a memory at the HO Execution Function e.g. until more recent information is received.

The VOIP_STATE_REPORT comprises one or more predictions related to a time to/until a VoIP state change. For example a prediction of how much time it is left until an active period, if the VoIP state="silent".

Figure 8:
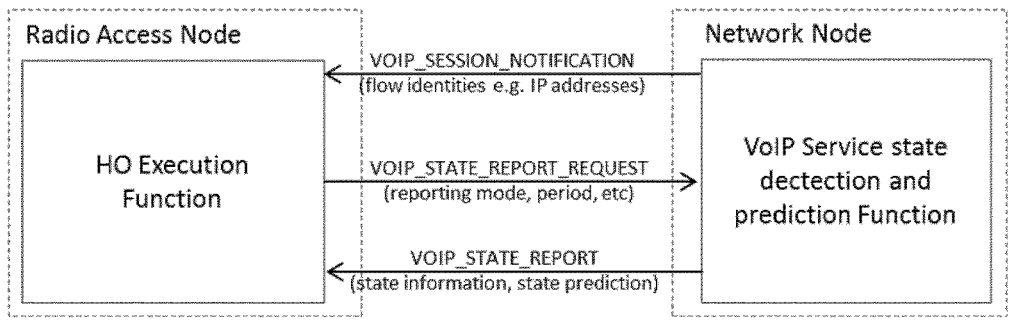
FIG. 8 illustrates a communication between a HO Execution Function node and a VoIP Service State detection and prediction Function node, according to an exemplifying embodiment.

An exemplifying illustration of a communication between an RA node and a Network node, according to an embodiment of the herein disclosed solution, is shown in FIG. 8.

Enhanced HO Execution Mechanism

The RA node discussed herein is assumed to comprise a Hand Over Execution function. Applying the herein disclosed solution to a prior art type of HO execution function will enhance its function, and enable a better user experience. The RA node will receive radio measurements from a mobile terminal, as usual, but also one or more VoIP state reports from a VoIP state detection and prediction function. Based on this information, the RA node, e.g. a HO execution function or module, may decide to trigger a HO execution, or to delay it.

Figure 9:
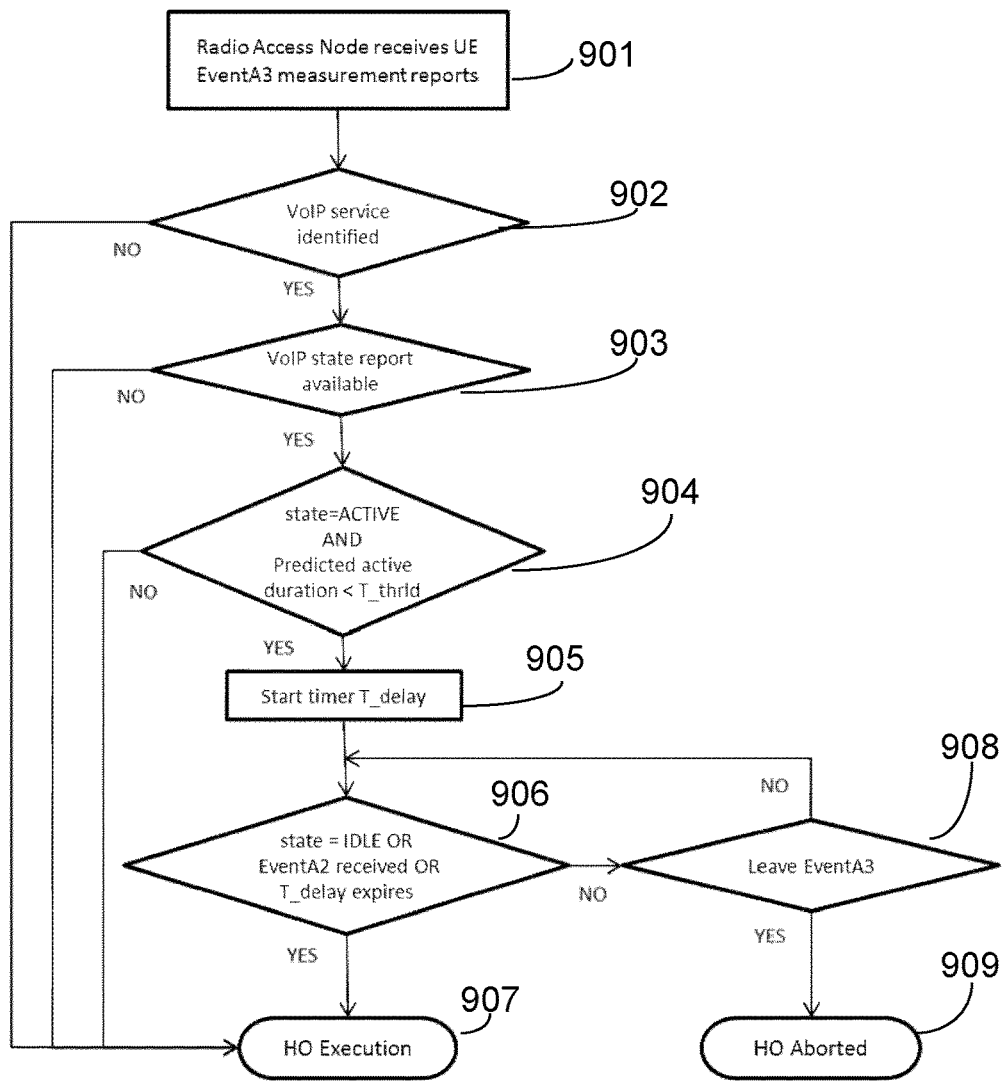
FIG. 9 is a flowchart illustrating an enhanced HO execution mechanism, according to an exemplifying embodiment.

One exemplifying realization of a method for enhanced HO execution performed by an RA node is illustrated in FIG. 9.

In an action 901, the RA node receives a radio measurement report, from a UE. The mobility report is associated with, e.g. indicates, a mobility event implying that a neighboring cell has become better (by an offset) than the serving cell, e.g. the mobility event denoted "EventA3" defined in LTE standard document TS 36.331. The receiving of an indication of such a mobility event makes the UE a candidate for HO, that is, in a prior art solution, the RA node would now initiate a HO preparation procedure, and the UE would have been handed over.

Upon the reception of the radio measurement report, given 902 that the UE in question is running a VoIP service, the radio access node may check 903 if a VoIP state report associated with the VoIP service/VoIP traffic flow is available, e.g. in a memory or a request for a VoIP state report could be sent to a Network node. For example, the VoIP state report may have been configured to be sent periodically and the most recent VoIP state report may be stored, ready for use, in a memory. In another embodiment, the VoIP state report may be requested by the radio RA node from the network node as previously described.

The VoIP state report may be used by the RA node to decide whether the HO should be delayed or not. If the VoIP state report indicates that the VoIP service is in a "silent" state, the HO procedure is continued, i.e. the HO is triggered or executed. In one embodiment, the RA node could then contact the target cell for HO preparation and execution.

When the VoIP state report indicates that the VoIP service is in an "active" state, the prediction comprised in the VoIP state report is checked 904 to decide if the HO should be delayed in wait of a VoIP state change to a "silent" or "idle" state. For example, a predicted duration of the active period may be compared with a configurable threshold T_thrld. When the predicted duration of the active period is shorter than the threshold T_thrld, the HO execution will be delayed 905 to wait for an expected VoIP idle state. In one embodiment, the HO delay is realized by delaying contacting the target cell for the HO preparation.

Upon the decision of delaying the HO, a timer, T_delay, is started 905. The T_delay may or may not be equal to the T_thrld. Before the expiry of the timer, the RA node keeps on monitoring service and network conditions to decide if the HO should be executed or further delayed. In one embodiment, the trigger of HO execution is the change of the VoIP state from "active" to "silent" (cf. from a first group of VoIP states to a second group of VoIP states). In case the RA node receives an indication from the UE during the delay of that the radio conditions have become very poor and there is a risk of a drop, the HO execution may be triggered before T_delay has expired or the VoIP state has changed, as a fallback action to avoid outage. That is, the HO may be triggered by that the RA node receives an indication of a mobility event such as the LTE "Event A2" which indicates that the UE has poor coverage and may have a risk to drop.

During the delaying period, the radio condition may be changed such that a HO may not be necessary anymore. In one embodiment, such a condition is indicated by that the UE is leaving Event A3. In this case, the HO should be aborted without taking further actions.

Radio Access, RA, Node

Embodiments described herein also relate to an RA node operable in a wireless communication network. The RA node is associated with the same technical features, objects and advantages as the method described above and illustrated e.g. with reference to FIG. 4.

Figure 10:
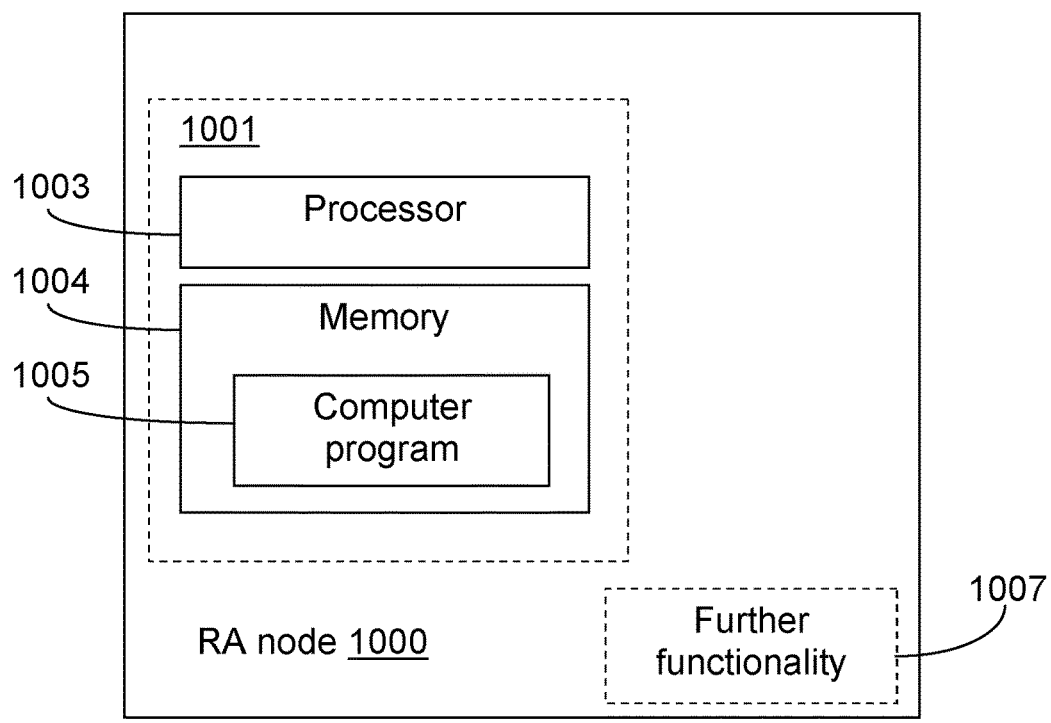
FIGS. 10 and 11 show an RA node according to exemplifying embodiments.

Below, implementations of an RA node will be described in a more general manner with reference to FIGS. 10-11. The RA node is configured to perform at least one of the method embodiments described above with reference to FIG. 4. The node will be described in brief in order to avoid unnecessary repetition.

The part of the RA node 1000 which is most affected by the adaptation to the herein described method is illustrated as an arrangement 1001, surrounded by a dashed line. The RA node 1000 or arrangement 1001 may be assumed to comprise further functionality 1006, for carrying out regular RA node functions, such as e.g. scheduling and power control.

The RA node or the arrangement part of the RA node may be implemented and/or described as follows:

The RA node 1000 comprises processing means 1003, such as a processor, and a memory 1004 for storing instructions, the memory comprising instructions, e.g. computer program 1005, which when executed by the processing means causes the RA node 1000 or arrangement 1001 to receive, from a Network Node, a VoIP session notification identifying a traffic flow associated with VoIP related to a UE served by the RA node, and further to receive, from the Network Node, a VoIP state report for the identified traffic flow, said VoIP state report comprising a determined VoIP state, and a prediction related to a time to a VoIP state change. The execution of the instructions further causes the RA node to decide whether to delay or to trigger the HO based on the VoIP state and the prediction, when said UE is a candidate for HO.

The RA node may be caused to decide to delay the HO when the determined VoIP state belongs to a first group of VoIP states and the prediction indicates that a time to a VoIP state change is within an estimated deadline for HO due to radio conditions. Further, the execution of the instructions may cause the RA node to decide to trigger the HO when the determined VoIP state belongs to a first group of VoIP states and the prediction indicates that a time to a VoIP state change exceeds an estimated deadline for HO due to radio conditions.

The prediction may, in addition to being related to a time to a VoIP state change, indicate a next VoIP state. The deciding of whether to delay or to trigger the HO may further be based on the next VoIP state.

The execution of the instructions may further cause the RA node to decide to delay the HO when the determined VoIP state belongs to a first group of VoIP states and the prediction indicates that a time to a VoIP state change is within an estimated deadline for HO due to radio conditions, and that the next VoIP state belongs to a second group of VoIP states.

The execution of the instructions may cause the RA node to decide to trigger the HO when the determined VoIP state belongs to a first group of VoIP states and the prediction indicates that the next VoIP state also belongs to the first group of VoIP states.

A first group of VoIP states may comprise at least a state of active bidirectional VoIP traffic; and a state of active unidirectional VoIP traffic in the downlink direction to the UE from the RA node.

A second group of VoIP states may comprise at least a state of mutual silence, implying no active VoIP traffic in either direction. The second group may further comprise a state of active unidirectional VoIP traffic in the uplink direction from the UE to the RA node.

The execution of the instructions may further cause the RA node to delay or trigger the HO of the UE according to the decision and/or to request a VoIP state report for the identified traffic flow, from the Network Node.

Figure 11:
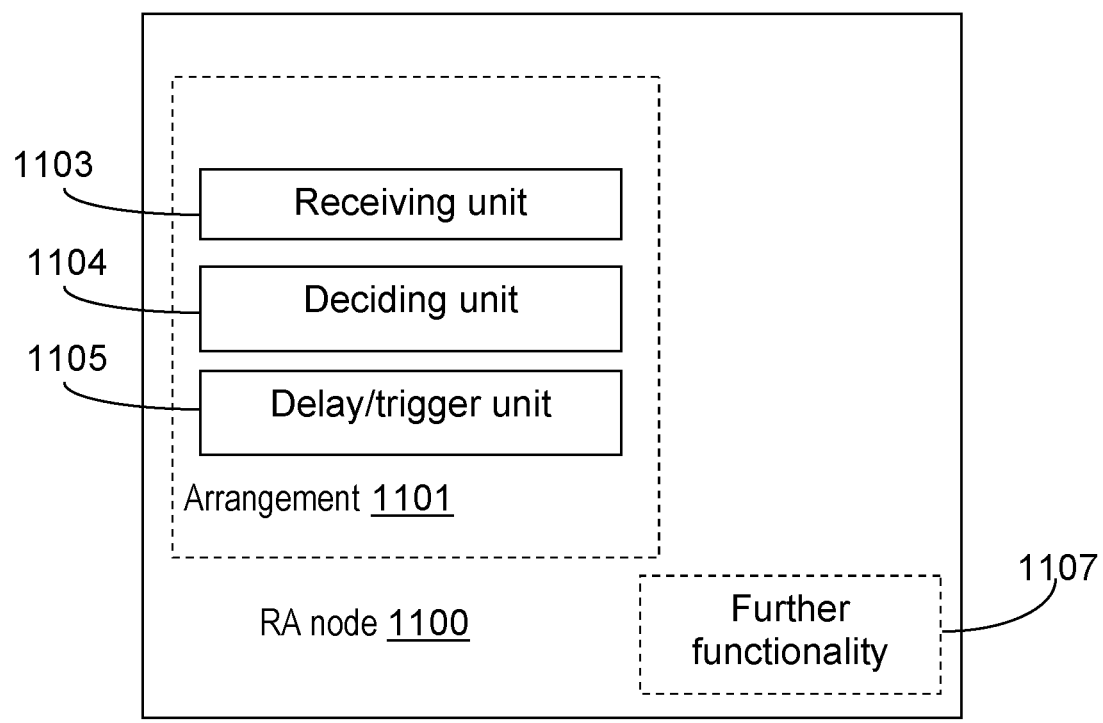

An alternative embodiment of the RA node 1000 is shown in FIG. 11. FIG. 11 illustrates an RA node 1100, operable in a wireless communication network. The part of the UE 1100 which is most affected by the adaptation to the herein described method is illustrated as an arrangement 1101, surrounded by a dashed line. The RA node 1100 or arrangement 1101 may be assumed to comprise further functionality 1106, for carrying out regular RA node functions.

The RA node 1100 or arrangement 1101 comprises a receiving unit 1103, configured to receive, from a Network Node, a VoIP session notification identifying a traffic flow associated with VoIP related to a UE served by the RA node. The receiving unit is further configured to receive, from the Network Node, a VoIP state report for the identified traffic flow, said VoIP state report comprising a determined VoIP state, and a prediction related to a time to a VoIP state change. The RA node further comprises a deciding unit 904, configured to decide, when said UE is a candidate for HO, whether to delay or to trigger the HO based on the VoIP state and the prediction.

The RA node 1000 could be configured for the different embodiments described above. For example, the RA node could comprise a delay/trigger unit 905 configured to delay or to trigger the HO in accordance with the decision.

Network Node

Embodiments described herein also relate to a Network Node operable in a wireless communication network. The Network Node is associated with the same technical features, objects and advantages as the method described above and illustrated e.g. with reference to FIG. 5.

Figure 12:
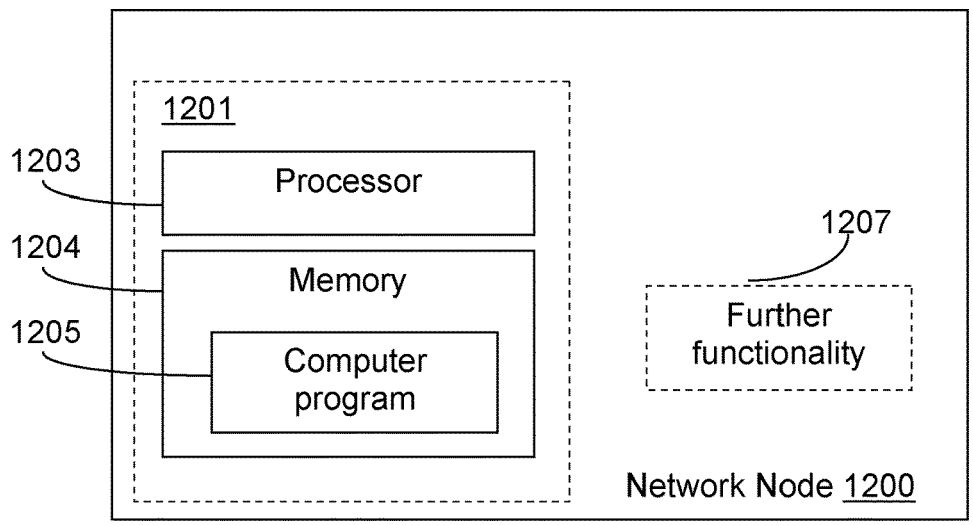
FIGS. 12 and 13 show a Network Node according to exemplifying embodiments.

Below, implementations of a Network Node will be described in a more general manner with reference to FIGS. 12-13. The Network Node is configured to perform at least one of the method embodiments described above with reference to FIG. 5. The node will be described in brief in order to avoid unnecessary repetition.

The part of the Network Node 1200 which is most affected by the adaptation to the herein described method is illustrated as an arrangement 1201, surrounded by a dashed line. The RA node 1200 or arrangement 1201 may be assumed to comprise further functionality 1206, for carrying out regular Network Node functions.

The Network Node or the arrangement part of the Network Node may be implemented and/or described as follows:

The Network Node 1200 comprises processing means 1203, such as a processor, and a memory 1204 for storing instructions, the memory comprising instructions, e.g. computer program 1205, which when executed by the processing means causes the Network Node 1200 or arrangement 1201 to detect a traffic flow associated with VoIP related to an RA node and a UE; and to send a VoIP session notification to the RA node, identifying the traffic flow associated with VoIP. The execution of the instructions further causes the Network node to determine a VoIP state of the traffic flow, and to derive a prediction related to a time to a VoIP state change for the traffic flow. The execution of the instructions further causes the Network node to send a VoIP state report for the traffic flow to the RA node, said VoIP state report comprising the determined VoIP state and the prediction. The h VoIP state report enables the RA node to decide whether to delay or trigger a HO of the UE based on said information.

The execution of the instructions may cause the Network Node to send the VoIP state report in response to a request for a VoIP state report, which request is received from the RA node.

The prediction may, in addition to being related to a time to a VoIP state change, further indicate a next VoIP state.

The execution of the instructions may further cause the Network Node to derive the prediction based on a statistical model underlying the behavior of a conversation or based on machine learning; and further to derive the prediction based on model information and/or on statistics gathered from a plurality of historic VoIP flows served by the wireless communication network.

The Network Node may be the same node as the RA node, i.e. the Network node may be the RA node.

Figure 13:
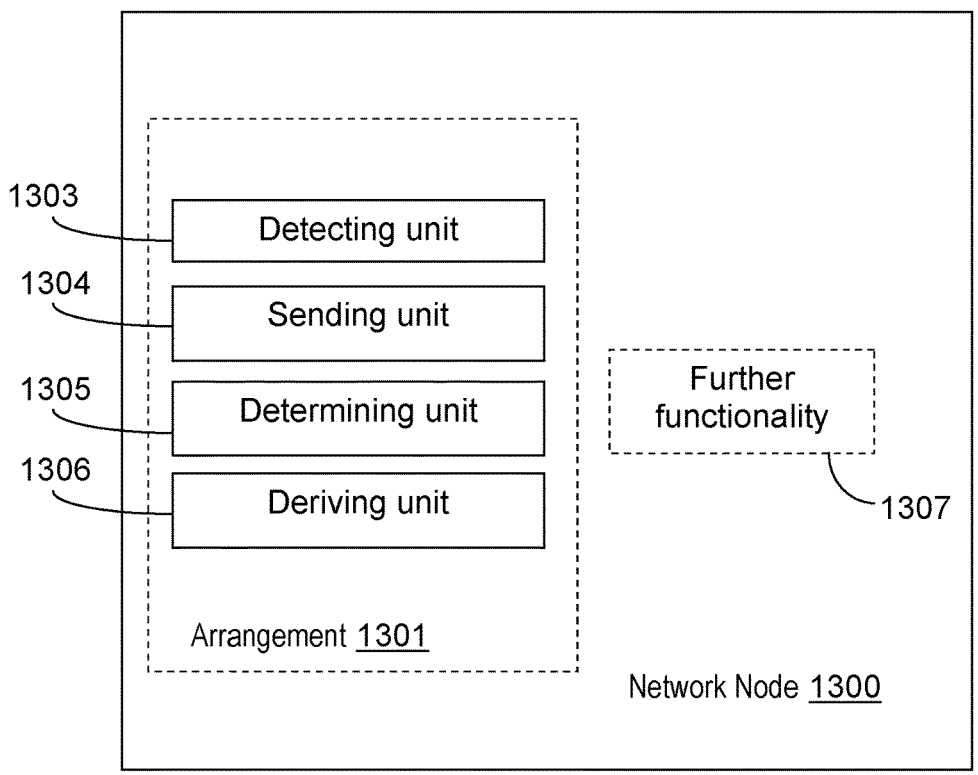

An alternative embodiment of the Network Node 1200 is shown in FIG. 13. FIG. 13 illustrates a Network Node 1300, operable in a wireless communication network. The part of the Network Node 1300 which is most affected by the adaptation to the herein described method is illustrated as an arrangement 1301, surrounded by a dashed line. The Network Node 1300 or arrangement 1301 may be assumed to comprise further functionality 1306, for carrying out regular Network Node functions.

The Network Node 1300, or arrangement 1301, comprises a detecting unit 1303, configured to detect a traffic flow associated with VoIP related to an RA node and to a UE. The Network Node further comprises a sending unit 1304, configured to send a VoIP session notification to the RA node, identifying the traffic flow associated with VoIP. The Network Node further comprises a determining unit 1305, configured to determine a VoIP state of the traffic flow; and a deriving unit 1306 configured to derive a prediction related to a time to a VoIP state change for the traffic flow. The sending unit 1304, or an additional sending unit is further configured to send a VoIP state report for the traffic flow to the RA node, where said VoIP state report comprises the determined VoIP state and the prediction.

The Network Node could further be configured for some or all of the different embodiments described above.

Figure 4:
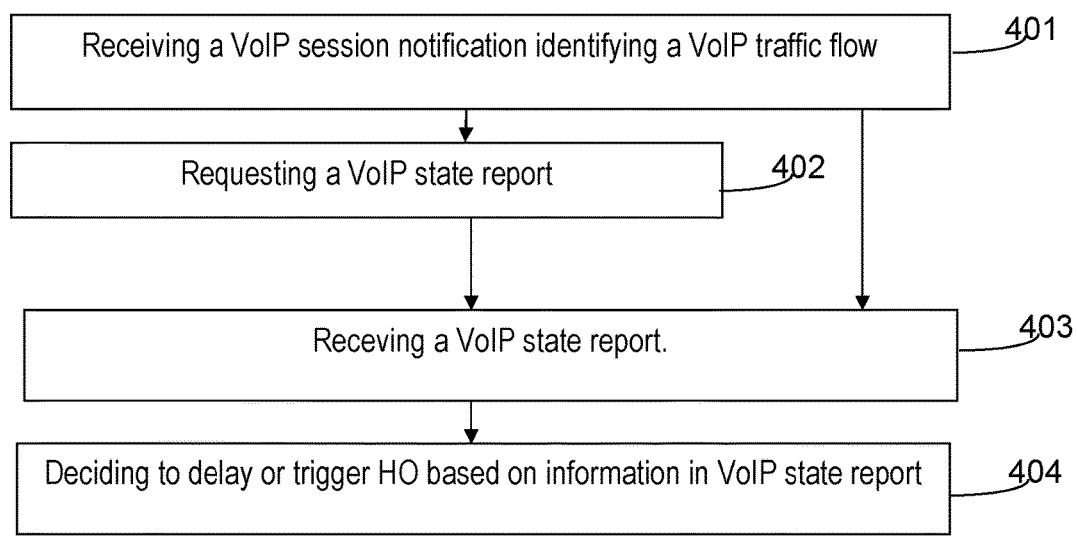
FIG. 4 illustrates a procedure in an RA node, according to an exemplifying embodiment.
Figure 5:
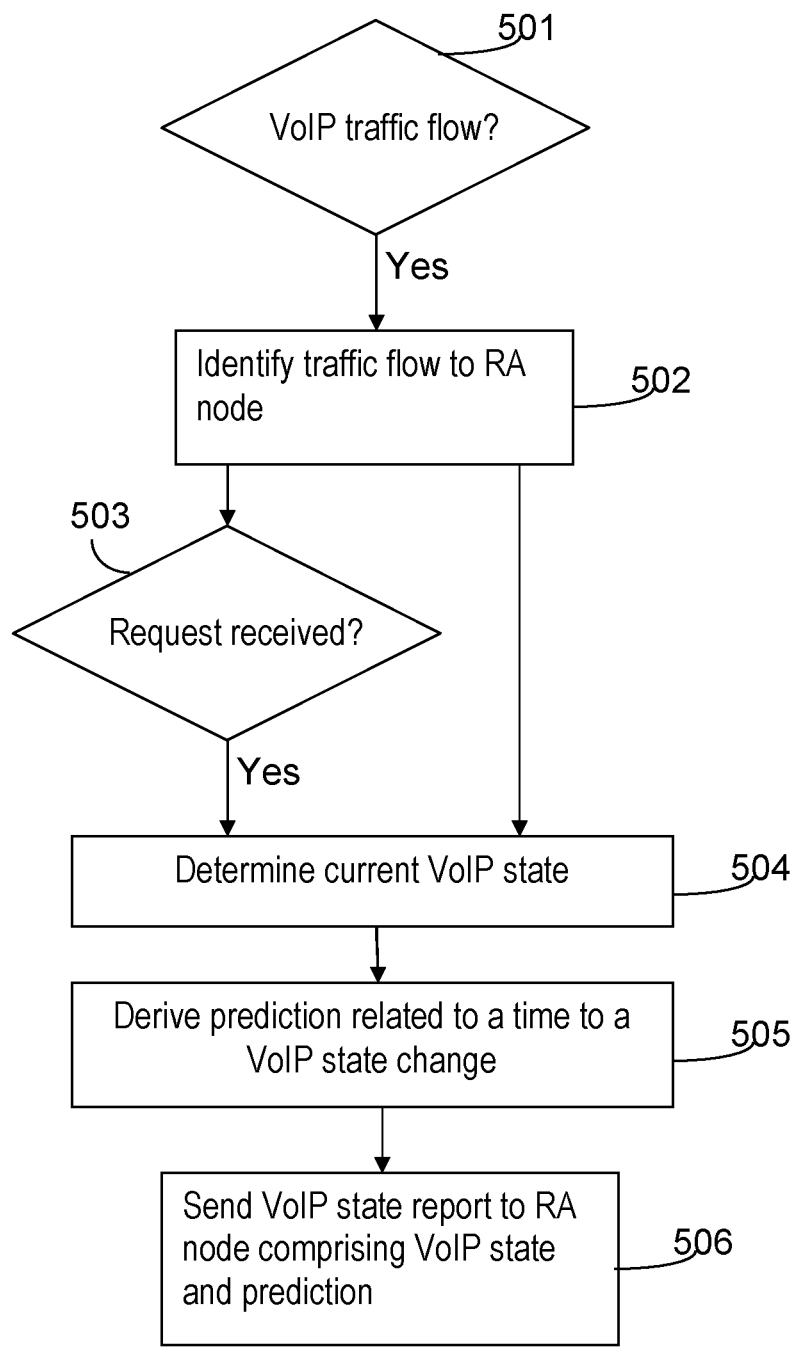
FIG. 5 illustrates a procedure in Network Node, according to an exemplifying embodiment.

The units or modules in the arrangements in the respective different RA node embodiments and Network Node embodiments described above could be implemented e.g. by one or more of: a processor or a microprocessor and adequate software and memory for storing thereof, a Programmable Logic Device (PLD) or other electronic component(s) or processing circuitry configured to perform the actions described above, and illustrated e.g. in FIGS. 4 and 5. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments.

ABBREVIATIONS

3GPP—3rd Generation Partnership Project
eNodeB—Enhanced Node B

HO—Hand Over
MME—Mobility Management Entity
LTE—Long Term Evolution
QoE—Quality of Experience
RSRP—Reference Signal Received Power
RSRQ—Reference Signal Received Quality
TTT—Time to Trigger
UE—User Equipment
VoIP—Voice over IP
VoLTE Voice over LTE

REFERENCES

1. H.-H. Choi; O. Song; J.-R. Lee. Voice-activity-based vertical handover in 3G-WLAN interworking networks, Electronics Letters (October 2009), 45 (21), pg. 1109-1101.

The invention claimed is:

1. A method for handling hand over (HO), the method comprising:
   a radio access (RA) node receiving, from a network node, a voice-over-IP (VoIP) session notification identifying a traffic flow associated with VoIP and related to a user equipment (UE),
   the RA node receiving, from the network node, a VoIP state report for the identified traffic flow, said VoIP state report comprising VoIP state information indicating a determined VoIP state and prediction information indicating a prediction related to a time to a predicted VoIP state change;
   detecting that said UE is a candidate for a HO; and
   after detecting that said UE is a candidate for a HO, deciding whether to delay or to trigger the HO based on the determined VoIP state and the prediction related to the time to the predicted VoIP state change, wherein
   deciding whether to delay or to trigger the HO based on the determined VoIP state and the prediction comprises determining, based on the prediction information, whether the predicted VoIP state change is predicted to occur within a certain amount of time.

2. The method of claim 1, wherein the HO is decided to be delayed when the determined VoIP state belongs to a first group of VoIP states and the prediction information indicates that a time to the predicted VoIP state change is within an estimated deadline for HO due to radio conditions.

3. The method of claim 1, wherein the HO is decided to be triggered when the determined VoIP state belongs to a first group of VoIP states and the prediction information indicates that a time to the predicted VoIP state change exceeds an estimated deadline for HO due to radio conditions.

4. The method of claim 1, wherein
   the prediction information comprises a time value indicating an estimated amount of time that will elapse before the predicted VoIP state change will occur,
   the prediction information indicates a predicted next VoIP state, and
   the deciding of whether to delay or to trigger the HO is further based on the predicted next VoIP state.

5. The method of claim 4, wherein the HO is decided to be delayed when the determined VoIP state belongs to a first group of VoIP states and the prediction information indicates that the predicted VoIP state change is within an estimated deadline for HO due to radio conditions, and that the predicted next VoIP state belongs to a second group of VoIP states.

6. The method of claim 4, wherein the HO is decided to be triggered:

when the determined VoIP state belongs to a first group of VoIP states and the predicted next VoIP state also belongs to the first group of VoIP states.

7. The method of claim 1, wherein a VoIP state change implies a change to a VoIP state belonging to another group of VoIP states than the determined VoIP state.

8. The method of claim 1, wherein a first group of VoIP states comprises at least states of:
   active bidirectional VoIP traffic; and
   active unidirectional VoIP traffic in the downlink direction to the UE from the RA node.

9. The method of claim 8, wherein a second group of VoIP states comprises at least a state of:
   mutual silence.

10. The method of claim 9, wherein the second group of VoIP states further comprises a state of:
    active unidirectional VoIP traffic in the uplink direction from the UE to the RA node.

11. The method of claim 1, wherein the prediction information related to the time to the predicted VoIP state change comprises a time value indicating an estimated amount of time that will elapse before the occurrence of the predicted VoIP state change.

12. The method of claim 1, wherein the method further comprises:
    requesting a VoIP state report for the identified traffic flow, from the network node.

13. A method for supporting hand over (HO), the method comprising:
    detecting, by a network node, a traffic flow associated with VoIP and related to a radio access (RA) node and a user equipment (UE);
    sending, by the network node, a VoIP session notification to the RA node, the VoIP session notification identifying the traffic flow;
    the network node determining a VoIP state of the traffic flow;
    the network node deriving a prediction related to a time to a predicted VoIP state change for the traffic flow; and
    the network node sending a VoIP state report for the traffic flow to the RA node, said VoIP state report comprising VoIP state information indicating the determined VoIP state and prediction information indicating the prediction related to the time to the predicted VoIP state change, which VoIP state report enables the RA node to determine, based on the prediction information, whether the predicted VoIP state change is predicted to occur within a certain amount of time.

14. The method of claim 13, wherein the VoIP state report is sent in response to a request for a VoIP state report, received from the RA node.

15. The method of claim 13, wherein the prediction information related to the time to the predicted VoIP state change comprises a time value indicating an estimated amount of time that will elapse before the occurrence of the predicted VoIP state change.

16. The method of claim 13, wherein the prediction is derived based on a statistical model underlying the behavior of a conversation or based on machine learning.

17. The method of claim 13, wherein the prediction is derived based on model information and/or on statistics gathered from a plurality of historic VoIP flows.

18. The method of claim 13, wherein the network node and the RA node are the same node.

19. A radio access (RA) node for handling hand over (HO), the RA node comprising:

a receiver for receiving: 1) a VoIP session notification transmitted by a network node, said VoIP session notification identifying a traffic flow associated with VoIP related to a user equipment (UE), and 2) a VoIP state report for the identified traffic flow, said VoIP state report comprising VoIP state information indicating a determined VoIP state and prediction information indicating a prediction related to a time to a predicted VoIP state change; and a processing apparatus, comprising one or more processors, configured such that, when said UE is a candidate for a HO, the processing apparatus decides whether to delay or to trigger the HO based on the VoIP state and the prediction information related to the time to the predicted VoIP state change, wherein the processing apparatus is configured to decide whether to delay or to trigger the HO by performing a process that includes the step of using the prediction information to determine whether the predicted VoIP state change is predicted to occur within a certain amount of time.

20. The RA node of claim 19, wherein the processing apparatus is configured such that the processing apparatus decides to delay the HO when the determined VoIP state belongs to a first group of VoIP states and the prediction indicates that a time to a VoIP state change is within an estimated deadline for HO due to radio conditions.

21. The RA node of claim 19, wherein the processing apparatus is configured such that the processing apparatus decides to trigger the HO when the determined VoIP state belongs to a first group of VoIP states and the prediction indicates that a time to a VoIP state change exceeds an estimated deadline for HO due to radio conditions.

22. The RA node of claim 19, wherein the prediction, in addition to being related to a time to a VoIP state change, indicates a predicted next VoIP state; and where the deciding of whether to delay or to trigger the HO is further based on the predicted next VoIP state.

23. The RA node of claim 22, wherein the processing apparatus is configured such that the processing apparatus decides to delay the HO when the determined VoIP state belongs to a first group of VoIP states and the prediction indicates that a time to a VoIP state change is within an estimated deadline for HO due to radio conditions, and that the predicted next VoIP state belongs to a second group of VoIP states.

24. The RA node of claim 22, wherein the processing apparatus is configured such that the processing apparatus decides to trigger the HO when the determined VoIP state belongs to a first group of VoIP states and the prediction indicates that the predicted next VoIP state also belongs to the first group of VoIP states.

25. The RA node of claim 19, wherein a first group of VoIP states comprises at least states of:
active bidirectional VoIP traffic; and
active unidirectional VoIP traffic in the downlink direction to the UE from the RA node.

26. The RA node of claim 25, wherein a second group of VoIP states comprises at least a state of:
mutual silence.

27. The RA node of claim 26, wherein the second group of VoIP states further comprises a state of:
active unidirectional VoIP traffic in the uplink direction from the UE to the RA node.

28. The RA node of claim 19, wherein the prediction information related to the time to the predicted VoIP state change comprises a time value indicating an estimated amount of time that will elapse before the occurrence of the predicted VoIP state change.

29. The RA node of claim 19, wherein the processing apparatus is configured such that the processing apparatus requests the network node to provide a VoIP state report for the identified traffic flow.

30. A network node for supporting hand over (HO), the network node comprising:
a receiver;
a transmitter; and
a processing apparatus comprising one or more processors, wherein the processing apparatus is configured to:
detect a traffic flow associated with VoIP related to a radio access (RA) node and a user equipment (UE);
employ the transmitter to send a VoIP session notification to the RA node, said VoIP session notification identifying the traffic flow associated with VoIP;
determine a VoIP state of the traffic flow;
derive a prediction related to a time to a predicted VoIP state change for the traffic flow; and
employ the transmitter to send a VoIP state report for the traffic flow to the RA node, said VoIP state report comprising VoIP state information indicating the determined VoIP state and prediction information indicating the prediction related to the time to the predicted VoIP state change, which VoIP state report enables the RA node to determine, based on the prediction information, whether the predicted VoIP state change is predicted to occur within a certain amount of time.

31. The network node of claim 30, wherein the processing apparatus is configured such that the processing apparatus employs the transmitter to send the VoIP state report in response to a request for a VoIP state report, received from the RA node.

32. The network node of claim 30, wherein the prediction information related to the time to the predicted VoIP state change comprises a time value indicating an estimated amount of time that will elapse before the occurrence of the predicted VoIP state change.

33. The network node of claim 30, wherein the processing apparatus is configured such that the processing apparatus derives the prediction based on a statistical model underlying the behavior of a conversation or based on machine learning.

34. The network node of claim 30, wherein the processing apparatus is configured such that the processing apparatus derives the prediction based on model information and/or on statistics gathered from a plurality of historic VoIP flows served by the wireless communication network.

35. The network node of claim 30, wherein the network node and the RA node is the same node.

* * * * *